(12) United States Patent
Gilbert

(10) Patent No.: US 6,377,891 B1
(45) Date of Patent: Apr. 23, 2002

(54) USER INTERFACE FOR GLOBAL POSITIONING SYSTEM RECEIVER

(75) Inventor: Charles Gilbert, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/249,495

(22) Filed: Feb. 12, 1999

(51) Int. Cl.$^7$ .............................. G01C 21/00; G01S 5/04
(52) U.S. Cl. ............. 701/213; 342/357.02; 342/357.06
(58) Field of Search ...................... 701/213; 342/357.03, 342/357.02, 357.06, 357.12; 455/154.1, 268, 161.3, 200.1, 254; 345/184

(56) References Cited

U.S. PATENT DOCUMENTS 4,247,952 A  *  1/1981  Shibuya .................... 455/200.1
5,805,145 A  *  9/1998  Jaeger ......................... 345/172
5,920,283 A  *  7/1999  Shaheen et al. ............ 701/213

OTHER PUBLICATIONS

Seskar, Ivan, et al, "A Software Radio Architecture for Linear Multiuser Detection", IEEE Journal on Selected Areas in Communications, vo. 17, No. 5, May 1999, Presented Mar. 1998., pp. 814–823.*

Brown, Alison, et al, "Digital L–Band Receiver Architecture With Direct RF Sampling", Plans '94, Apr. 1994, pp. 209–216.*

* cited by examiner

Primary Examiner—Gregory C. Issing
(74) Attorney, Agent, or Firm—Blakely, Sokoloff, Taylor & Zafman LLP

(57) ABSTRACT

A control system for a GPS receiver allows adjustment of a number of data collection (i.e., configuration) parameters for the receiver. Preferably, a single interface allows for setting multiple parameters at the same time. Setting the configuration parameters may be in response to a user input specifying a desired quality of position estimate to be provided by the receiver and may be accomplished using a slide bar control. The slide bar control may be a graphical representation displayed to the user and may allow the user to choose from a number of predetermined settings, each corresponding to a set of different configuration parameters for the receiver. Distribution of the settings over the range of a slide bar control need not be linear. Preferably, each set of the configuration parameters includes a setting for a PDOP mask, a signal to noise ratio mask, an elevation mask and a minimum number of satellites to be used by the receiver in making a position computation.

29 Claims, 5 Drawing Sheets

| SCALE CONFIG. PARAMETERS | MAX QUALITY ‖────┼────┼────┼────┼────┼────┼────‖ MAX QUALITY | | | | | | | |
|---|---|---|---|---|---|---|---|---|
| PDOP MASK | 4 | 4.5 | 5 | 5.5 | 6 | 7 | 8 | 12 | 20 |
| SNR MASK | 6 | 5.5 | 5 | 4.5 | 4 | 3.5 | 3 | 2.5 | 2 |
| MIN # OF SV | 5 | 5 | 5 | 4 | 4 | 4 | 4 | 3 | 3 |
| ELEV. MASK | 15 | 15 | 15 | 14 | 13 | 13 | 12 | 10 | 5 |

USER INTERFACE FOR GLOBAL POSITIONING SYSTEM RECEIVER

FIELD OF THE INVENTION

The present invention relates generally to global positioning system (GPS) receivers and, more particularly, to the control of configuration or operating parameters for such receivers.

BACKGROUND

GPS receivers are designed to provide estimates of a user's position on or near the surface of the earth based on ranging measurements to orbiting satellites. Performance capabilities of such receivers are primarily affected by two factors. First, satellite geometry, which causes geometric dilution of precision, and second, ranging errors.

Ranging errors are generally organized within six major areas including errors due to satellite ephemeris information, satellite clock errors, ionospheric group delay, tropospheric group delay, multipath errors, and receiver measurement errors. Modern GPS receivers typically employ processing techniques to reduce or eliminate the effects of these errors.

Geometric dilution errors can be calculated for any instantaneous satellite configuration as seen from a particular user's location. It has been determined that for a 21-satellite constellation and a three-dimensional position fix, the world-wide median value of the geometric dilution factor is approximately 2.7. This quantity is usually called the position dilution of precision (PDOP). Typical usable PDOP factors range from approximately 1.5 to approximately 8. In general, PDOP factors may vary between 1.0 and $\infty$, however, most users will not accept positions computed with a PDOP of greater than approximately 15. Variations in this PDOP factor are typically much greater than the variations in ranging errors.

Using these error factors, the root mean square (RMS) position error provided by a conventional GPS receiver may be expressed as follows:

$$\text{RMS position error} = \text{geometric dilution} \times \text{RMS ranging error.}$$

See, e.g., Bradford W. Parkinson and James J. Spilker Jr., *Global Positioning System: Theory and Applications*, Vol. 1, p. 16 (1996). Thus, the lower the geometric dilution factor (usually PDOP for terrestrial applications), the better the position estimate that a GPS receiver is able to provide.

Understanding the effect PDOP (or any one of a variety of other parameters for that matter) has on the accuracy of position estimates provided by a GPS receiver is important; especially considering that conventional GPS receivers typically do not utilize all of the satellite data which they receive to derive a position estimate. Instead, most GPS receivers employ masks or filters to select only data from those satellites which satisfy certain selection criteria (e.g., minimum elevation above the horizon) to derive a position solution. For example, filters or masks may be used to ensure that a desired maximum PDOP is permitted.

The use of such filters is important because, to achieve a positioning accuracy to a given requirement (say ±1.0 meter), the ranging accuracy and satellite geometry must both be within acceptable tolerances. For example, if individual ranging measurements to satellites have statistically independent error of zero mean, then PDOP becomes a direct multiplier in determining position error. Generally, if PDOP rises above six, it is an indication that satellite geometry is not very good from the user's stand point, and significant position errors can be expected. By controlling the limit on the maximum acceptable PDOP then, a GPS receiver can be configured to provide position fixes to a desired degree of accuracy.

In addition to PDOP, many other factors influence the relative accuracy of a position determination made by a GPS receiver. Among these factors are the number of satellites used to compute the position fix, the relative signal to noise (SNR) strength of the data signals received from those satellites, satellite geometry and cutoff elevation. In addition, the optimal configuration of operating parameters is also a function of both the work environment and the user's application. For example, the optimal configuration for a city environment is different from a rural environment. Furthermore, one user's application may require a fast acquisition and determination of location while another may require a highly precise determination of position, regardless of the amount of time required to determine the position.

In the past, some conventional GPS receivers have allowed users to modify some of these configuration parameters individually, in order to allow the user to customize the receiver for a given application or environment. However, knowing which receiver parameters to adjust, and in what fashion, typically requires knowledge about the satellite data signals which are currently being received. In most cases, users either do not have such information or are not familiar enough with the operation of the receiver to make an intelligent decision about which configuration parameter(s) to adjust and how. Accordingly, what is needed is a means of easily adjusting the configuration parameters of a GPS receiver to achieve a desired degree of accuracy in the position estimates provided thereby.

SUMMARY OF INVENTION

The present invention provides, in one embodiment, a control system for a GPS receiver that allows users to easily and simultaneously adjust multiple data collection (i.e., configuration) or operating parameters for the receiver. Thus, if a user is unsuccessful in obtaining a position fix with a given set of receiver configuration parameters, those parameters may be quickly modified to allow the user to obtain a position fix.

In another embodiment, the present invention provides a method of setting configuration parameters for a GPS receiver in response to user input specifying a desired quality of position estimate to be provided by the receiver. The user input may be received using a slide bar control, which may be a graphical representation displayed to the user. The slide bar control may allow the user to choose from a number of predetermined settings, each corresponding to a set of GPS receivers configuration parameters. Distribution of the settings over the range of the slide bar control need not be linear. Preferably, each set of the configuration parameters includes a setting for a PDOP mask, an SNR mask, an elevation mask and a minimum number of satellites to be used by the receiver in making a position compensation. In other embodiments, other combinations of configuration parameters may comprise a set.

These and other features and advantages of the present invention will be apparent from the detailed description and its accompanying drawings which follow.

BRIEF DESCRIPTION OF THE DRAWINGS

The present invention is illustrated by way of example, and not limitation, in the figures of the accompanying drawings in which.

DETAILED DESCRIPTION

Described herein is a control system for a GPS receiver which allows a user to adjust multiple data collection (i.e., configuration) or operating parameters for the receiver. Although discussed with reference to the exemplary embodiment which comprises a slide bar interface, the present invention may be implemented using a variety of types of interfaces. For example, in addition to the slide bar interface to be discussed in detail below, the present invention may be implemented as a dial control or other convenient mechanical and/or graphical user interface mechanism. Indeed, the slide bar interface itself may be implemented in a number of ways, including a graphical representation controlled with user input means (e.g., buttons, dial controls, etc.) or a physical slider similar to some user controls (e.g., sliding volume controls) found on audio/video equipment, etc.). Accordingly, the exemplary embodiments discussed below should in no way limit the more general spirit and scope of the present invention.

Figure 1A:
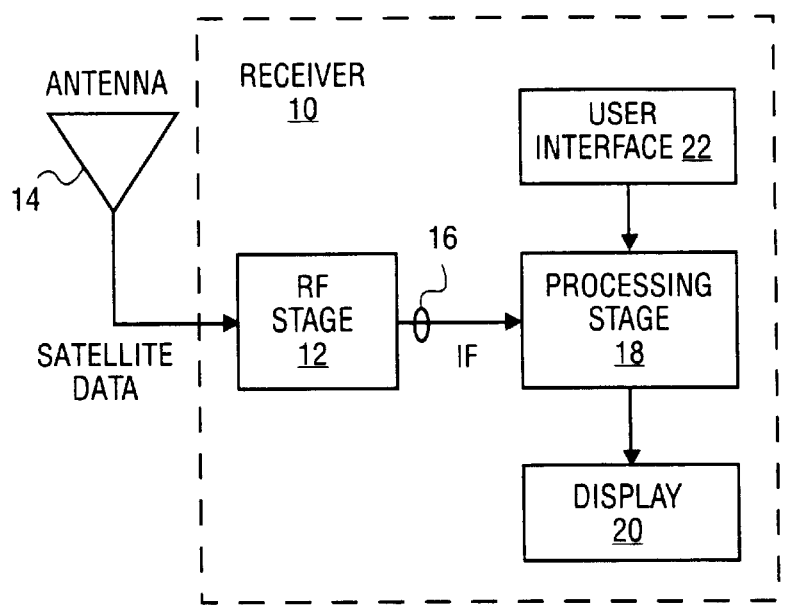
FIG. 1a illustrates one embodiment of a GPS receiver having a user interface configured in accordance with the teachings of the present invention.

FIG. 1 illustrates one embodiment of a GPS receiver 10 configured in accordance with the present invention. Receiver 10 generally includes an RF stage 12 which receives satellite data signals collected by an antenna 14. In some cases receiver 10 and antenna 14 may be included within the same housing. In general, RF stage 12 provides amplification and down converting of the satellite data signals collected by antenna 14 and produces intermediate frequency (IF) output signals 16 therefrom. The IF signals 16 are subsequently provided to a processing stage 18.

Processing stage 18 may be implemented in hardware (e.g., as correlators or one or more application specific integrated circuits), software (e.g., running on a general purpose microprocessor or a dedicated digital signal processor) or a combination of both. As will be discussed below, in determining which satellites to use in making the position computations, processing stage 18 relies in part on user input received from a user interface 22. In general, processing stage 18 operates on the IF signals 16 to determine the position of receiver 10 (or, more particularly, antenna 14). For example, processing stage 18 may utilize the down converted satellite data signals to determine pseudoranges to the orbiting GPS satellites from which those signals were received. Based on these pseudoranges, an estimate of the position of receiver 10 may be derived (e.g., using GPS ranging techniques common in the art, including differential GPS processing techniques) and that position estimate may be presented to a user on an associated display 20. Display 20 may be an alpha-numeric and/or graphical display. In one exemplary embodiment, display 20 is a liquid crystal display (LCD).

The optimal performance of the receiver is directly related to the type of application the receiver is performing, as well as the environment in which the receiver is operating. For example, the performance of the receiver will vary significantly between an open field in a rural area, in which a large number of satellites are in view, and a city with a number of skyscrapers in close proximity which block satellites from view. Furthermore, the user application will dictate optimal performance. In some instances a user requires fast acquisition of the signals needed to compute location. At other times, acquisition time is not as important as the accuracy or level of precision of the location determined.

The present invention enables the user to easily control operating or configuration parameters using the user interface 22 without specifically and individually changing the parameters. Preferably, a single control is used to control a plurality of parameters.

In general, user interface 22 provides means for setting parameters of receiver 10, those parameters specifying a qualitative or quantitative value such as a desired quality of the position estimate, speed of acquisition or type of usage to be provided by processing stage 18. More specifically, user interface 22 is part of a control system for receiver 10 that allows users to easily and simultaneously adjust multiple data collection parameters for the receiver. For example, if a user is unsuccessful in obtaining a position fix with a given set of receiver configuration parameters, those parameters may be quickly modified, via user interface 22, to allow the user to obtain a position fix. The position fix so obtained may be less accurate (due to the modification of the receiver's configuration parameters) than one which would have been obtained using the original configuration parameter settings; however, as no fixes were being achieved at those settings, this (possibly less accurate) newly obtained position fix at least provides the user with an indication of his or her position (i.e., the position of antenna 14). Alternately, a user may trade precision for speed of acquisition.

Figure 1B:
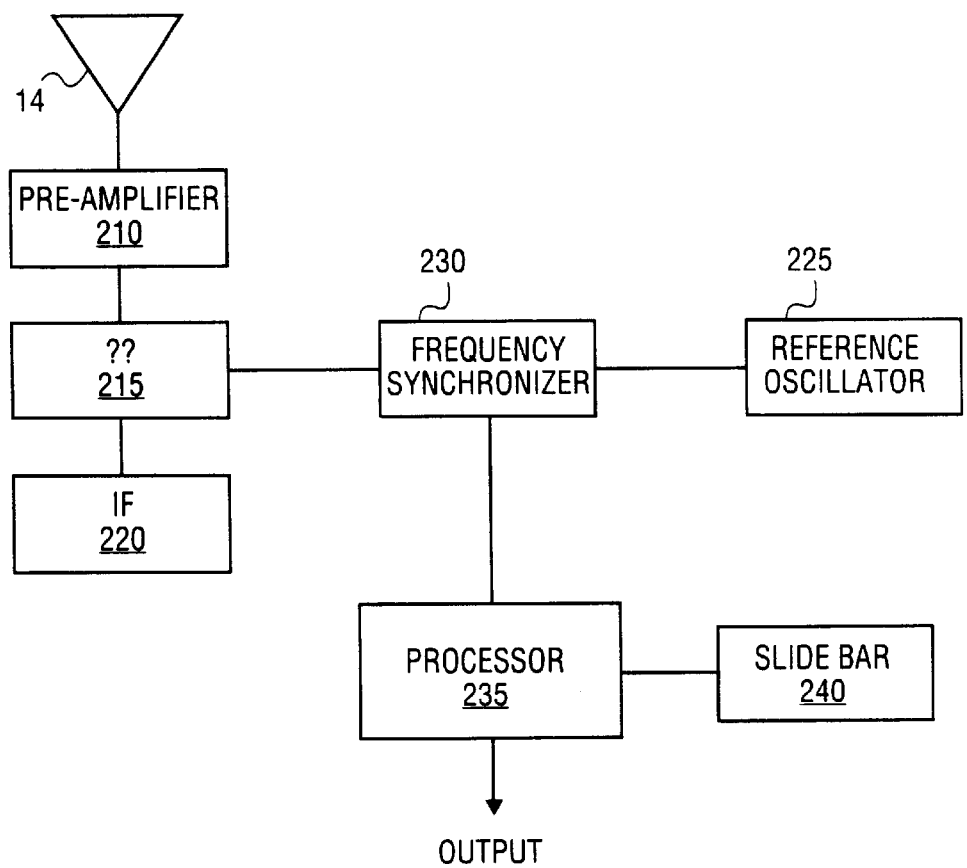
FIG. 1b illustrates an alternate embodiment of a GPS receiver having a user interface configured in accordance with the teachings of the present invention.

An alternate embodiment of a receiver is illustrated in FIG. 1b. The antenna 105 receives the positioning signals from a plurality of satellites in view. A received signal is processed by the preamplifier 110 and the down-converter 115 converts the signal to an intermediate frequency that is easier to process. IF filter 120 filters out noise and interference and increases the amplitude of the signal plus noise to a workable signal processing level.

The reference oscillator 125 provides a time and frequency reference for the receiver. The reference oscillator 125 output is used in the frequency synthesizer 130 which generates local oscillators and clocks used by the receiver. The processor performs the signal processing function required to determine position. In the present embodiment, the processor 135 is shown as a single block processing element. However, at implementation, the processing function may be divided among one or more processors. For example, there may be a signal processing processor that generates data, including pseudo ranges, pseudo range rates, delta pseudo ranges, signal-to-noise ratios, local receiver time tags and other GPS system data. An applications processor may also be provided which controls the signal processing function and uses the outputs of the signal processing processor to generate data for a particular user application.

Figure 2:
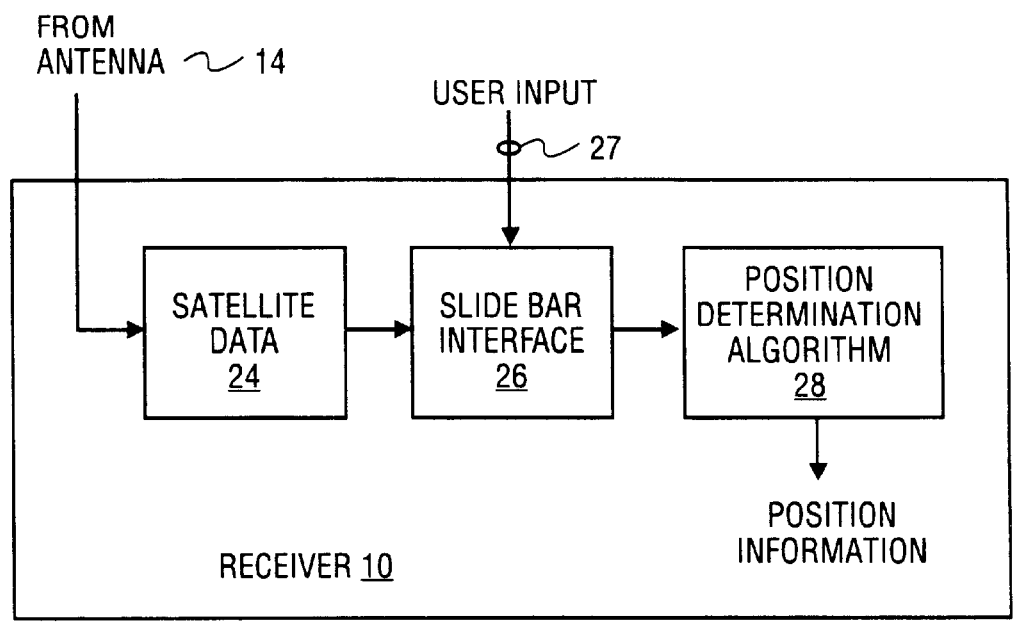
FIG. 2 is a functional representation of a receiver and illustrates one embodiment of a slide bar interface which is one exemplary embodiment of the present invention.

FIG. 2 illustrates certain functional portions of one embodiment of a receiver 10. In this embodiment, a slide bar interface, as discussed below, is used. However, alternate embodiments may be implemented. For example, the user input received through the user interface may be input a numeric or alphanumeric value which is used as parameters to generate parameter input to the position processing algorithm or application specific algorithm to determine how the position computations are determined.

Referring to the embodiment in FIG. 2, satellite data 24 received from antenna 14 is filtered by a slide bar interface 26. Slide bar interface 26 is under the control of user input 27, e.g., received through user interface 22. In general, slide bar interface 26 will pass only those portions of satellite data 24 which meet user specified criteria to achieve a desired quality of position estimate. Such data which meets those criteria is provided to a position determination algorithm 28 which may be executed by processing stage 18 to produce the position information.

Figures 5, 6:
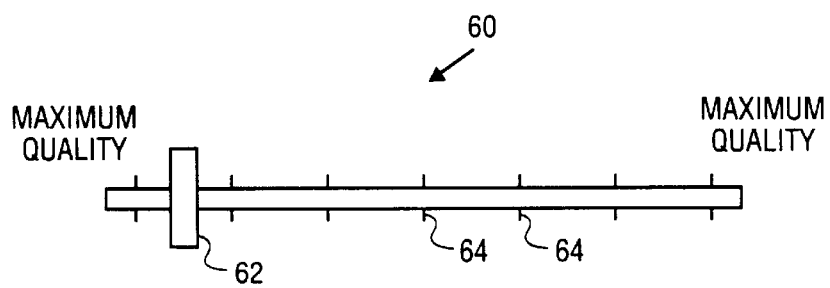
FIG. 5 is a table listing exemplary configuration parameter settings for a slide bar interface.
FIG. 6 illustrates a physical slide bar control for use according to one embodiment of the present invention.

Slide bar interface 26 provides means for setting configuration parameters for GPS receiver 10 in response to user input 27 which specifies the desired performance of the receiver 10. The user input 27 may be received using a slide bar control, which may be a graphical representation displayed to the user. Such a graphical representation is discussed further below. Alternatively, the mechanism used to control slide bar interface 26 may be implemented as a dial control or other convenient user interface mechanism. Indeed, the slide bar control may be implemented as a physical slider, similar to some user controls (e.g., sliding volume controls) found on audio/video equipment, etc.). Such a slide bar control 60 is illustrated in FIG. 6.

The slide bar control 60 includes a slider 62 that may allow the user to move between maximum and minimum control settings. This enables he user to choose from a number of settings 64, each corresponding to a set of GPS receiver configuration parameters. In the present embodiment, the perceived minimum value 305 is identified as maximizing quality and the maximum value 315 is identified as minimizing quantity. It is readily apparent that the labels associated with performance versus quality can be identified a variety of ways. Thus, the user simply moves the slider between the minimum and the maximum to adjust the performance of the receiver. The system responds to movement of the slider by adjusting corresponding operating parameters automatically without the user requiring to identify adjustments to parameters, or even the particular parameters to be adjusted.

Figure 3:
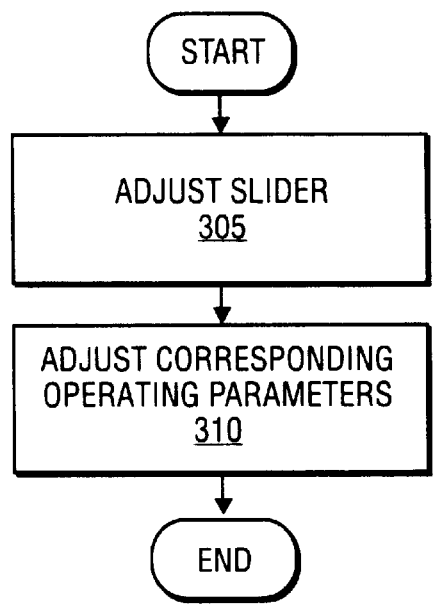
FIG. 3 is a simplified flow diagram of one embodiment of a process in accordance with the teachings of the present invention.

The process is described simply with respect to FIG. 3. At step 305 the slider is adjusted, and at step 310 the corresponding operating parameters are adjusted according to the location of the slider. For example, if the user is not receiving enough position information frequently enough, the user simply slides the slider to the right. To the contrary, if the quality of position information determined is not sufficient, the user slides the slider to the left. It is contemplated that the slide control can adjust a variety of predetermined operating parameters that may affect performance and quality. In the present embodiment, the slide bar controls the following parameters: Position Dilution of Precision (PDOP) mask, Signal-To-Noise Ratio (SNR) mask, Elevation mask, and minimum number of satellites to use to generate positions.

The operating parameter settings that correspond to different slider positions on the slide bar can also vary in application. Preferably the settings of the operating parameters are empirically determined. In the present embodiment, the numeric settings are non-linear, as some settings have a more pronounced effect on the system performance than others. For example, PDOP has a greater impact on position quality than SNR. To accommodate these observations, different parameters change at different rates and change in a non linear manner. Of course, other slide bar controller implementations may be used.

Figure 4A:
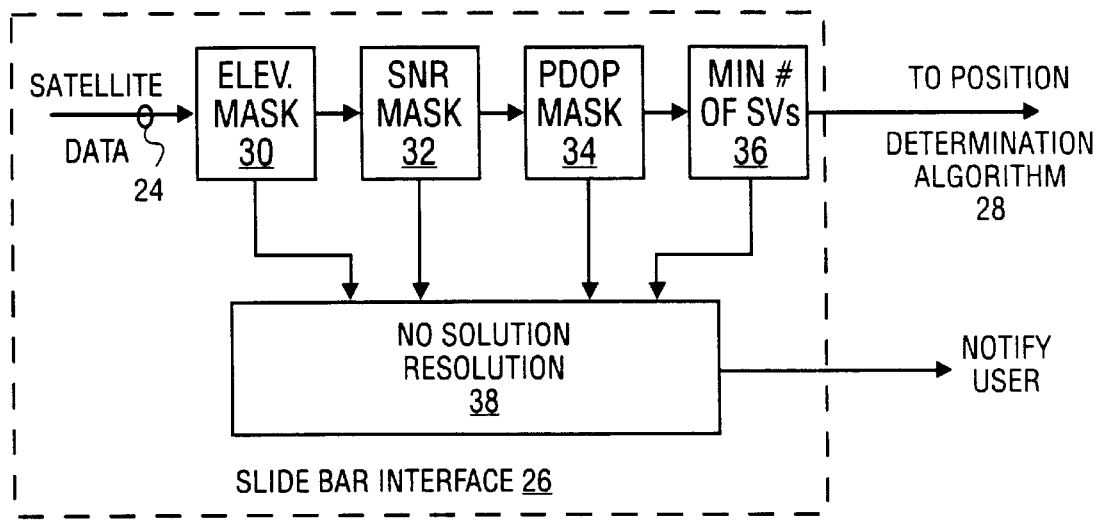
FIG. 4a illustrates a slide bar interface shown in more detail.

FIG. 4a illustrates one embodiment of a slide bar interface 26 in further detail. As shown, slide bar interface 26 may have a number of stages (four for the illustrated embodiment), each of which define a configuration parameter for the receiver 10. The operation of the number of stages may be configured using a single user interface control such as the slide bar described herein.

Satellite data 24 may first be applied to an elevation mask 30. The purpose of elevation mask 30 is to exclude data from those satellites that are positioned below a designated elevation threshold as seen by antenna 14. In this way, only signals from satellites which are positioned at elevations sufficiently above the horizon so as to contribute to a position fix of the desired quality are utilized by receiver 10.

Signals which are not excluded by elevation mask 30 are then applied to a signal to noise ratio (SNR) mask 32. SNR mask 32 allows only those signals which have a sufficient signal to noise ratio so as to contribute to a position fix of the desired quality to pass. Those signals are then applied to a PDOP mask 34 which filters out those signals from satellites which do not meet a desired PDOP criterion. Remaining signals are applied to a stage 36 which ensures that data signals from at least a designated minimum number of satellites are still present.

Assuming signals from a sufficient number of satellites so as to contribute to a position fix of the desired quality are still present, those signals are applied to the position determination algorithm 28 to compute an estimate of the position of receiver 10.

As shown, each of the stages 30, 32, 34 and 36 of slide bar interface 26 will exclude signals which may otherwise have been used for the position computation. If at any time insufficient data remains to achieve a position solution which would meet or exceed the desired quality (as specified by user input 27), that information is reported to a stage 38. Stage 38 is a "no solution resolution stage" which recognizes that insufficient information or satellite data signals is/are present in the received satellite data 24 to satisfy the desired quality of position fix. Stage 38 may report this information to the user (e.g., by reporting an error message to processing stage 18 which may then cause a message to be displayed to the user on display 20) as a prompt for the user to select a different set of configuration parameter using slide bar interface 26. It should be appreciated that two or more of the above-described filtering operations may be performed in parallel rather than in the serial fashion discussed above. Furthermore, the stages described above may be implemented as a single stage. Alternately, such functionality may be implemented directly in a computation performed in software or hardware. Furthermore, in alternate embodiments, the masks may be realized as weighting functions or other types of filters which manipulate the data to perform computations.

Figure 4B:
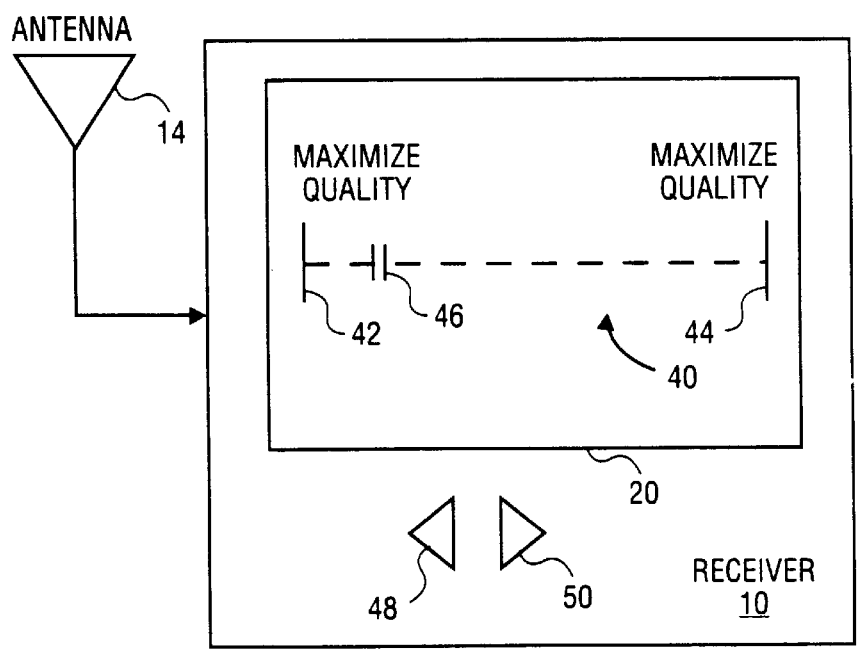
FIG. 4b illustrates an exemplary graphical representation of the slide bar control.

Now referring to FIG. 4b, one exemplary implementation of a slide bar control 26 is shown. In this example, a slide bar control is a graphical representation 40 displayed on display 20 of receiver 10. The graphical representation 40 simulates a slide bar (e.g., slide bar 60) that can move between two limits 42 and 44. Preferably, a "maximize quality" limit 42 corresponds to receiver configuration that will maximize the quality of position estimates provided by receiver 10. In general, such a configuration is achieved using data from a relatively high number of satellites which together have a low PDOP, high signal-to-noise ratio signal strength and are positioned relatively high above the horizon seen by antenna 14. At the opposite end of the graphical representation 40 is a "maximize quantity" limit 44, which corresponds to a receiver configuration that would maximize the number of position estimates provided by receiver 10. These position estimates may not be accurate, depending on the satellite geometry, etc., at the time, but will allow the user to obtain some estimate of his or her position. Such a configuration may be characterized by utilizing satellite data from a relatively few number of satellites which together may have a high PDOP, low signal-to-noise ratio signal strength and may be positioned relatively low above the horizon seen by antenna 14.

The slider 46 of the graphical representation 40 of the slide bar control may be controlled using push buttons 48 and 50 on the face of receiver 10 (or any other convenient means of controlling the slider 46). In this embodiment, as a user presses push button 48, slider 46 moves toward limit 42, for example stopping at predetermined settings of slide bar interface 26. Similarly, as the user presses push bottom 50, slider 46 moves towards limit 44, again stopping at predetermined settings between the limits. It is apparent that the slider 46 may be moved a variety of ways including using certain keys on a keypad, or select and drag operations on the slider graphically displayed.

FIG. 5 is a table illustrating a exemplary sets of receiver configuration parameters for various settings of slide bar interface 26. These particular sets of parameters have been empirically found to provide increasing quality of position fixes as one moves from right to left in the table. However, these exemplary sets of parameters should be regarded as illustrative and not restrictive of the scope of the present invention. Furthermore, it should be realized that operation using these parameters may be step-wise or continuous, using proper interpolation or empirical techniques to provide continuous settings.

In this example, the parameters set by slide bar interface 26 correspond to the mask stages illustrated in FIG. 4a. In particular, settings for PDOP, SNR, elevation and a minimum number of satellites are used, however, other combinations of two or more GPS receiver parameters may also be used. In addition, the values may be weighted according to the location of the slide bar manipulated by the user. The various sets of configuration parameters may correspond to predetermined stops for the slider 46. Thus, when slider 46 is positioned at the "maximize quality" limit 42, slide bar interface 26 will be configured so that elevation mask 30 is set to exclude signals from those satellites which are lower than 15 degrees above the horizon seen by antenna 14. Similarly, SNR mask 32 will be set to reject satellite signals which have a signal-to-noise ration of lower than 5.5 units. In this example, the SNR mask settings do not necessarily correspond to familiar logarithmically scaled signal-to-noise ratio measures. Instead, the SNR settings may be linearly scaled measures. The same setting for slide bar interface 26 will require that signals from a minimum of 5 satellites are present at stage 34. Further, those satellites must have a PDOP of 4 or better as determined by PDOP mask 36. The other sets of configuration parameters illustrated in the table of FIG. 5 have similar effects on the mask settings for slide bar interface 26 and may correspond to various stops between limits 42 and 44 as described above. Thus, by positioning slider 46 at one position, multiple data collection (i.e., configuration) parameters for receiver 10 have been set. As seen in the table, the sets of configuration parameters corresponding to the predetermined settings of the slide bar interface 26 are distributed in a non-linear fashion over the range of settings provided thereby.

In operation, is a user is unable to achieve any position fixes with slider 46 set at the stop corresponding to the maximum quality setting of slide bar interface 26, the user may quickly modify the receiver's configuration parameters (i.e., those controlled by slide bar interface 26) by adjusting the position of slider 46. As slider 46 is moved to other positions along the slide bar shown as graphical representation 40, the various masks of slide bar interface 26 are adjusted to correspond to the settings shown in the table of FIG. 5. In some cases, if slider 46 is adjusted to a position between two designated stops, receiver 10 may interpolate between the configuration parameter settings which correspond to those stops and configure the masks of slide bar interface 26 appropriately. Thus, slide bar interface 26 provides a control system for that allows users to easily and simultaneously adjust multiple data collection (i.e., configuration) parameters for receiver 10.

Figure 7:
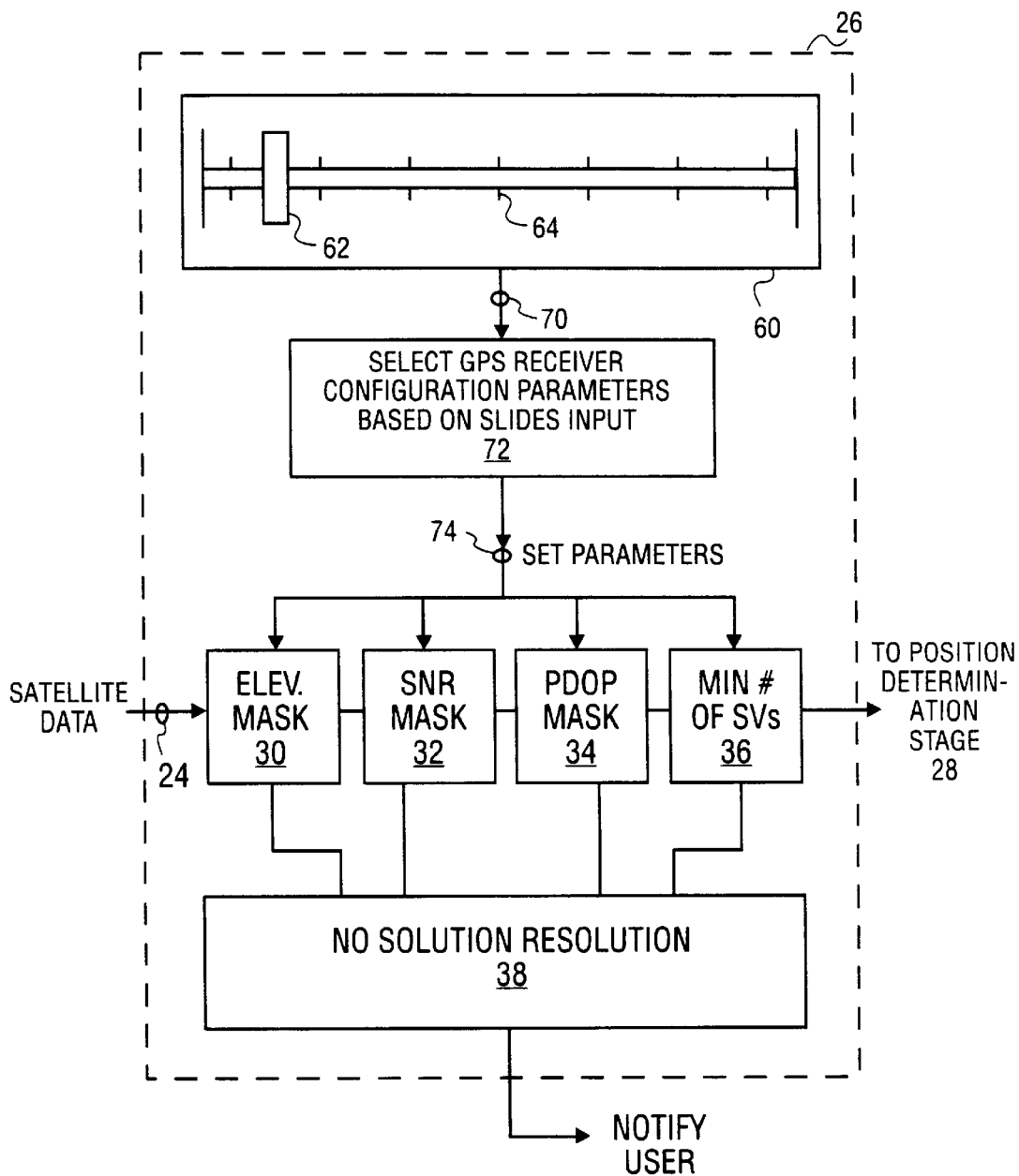
FIG. 7 illustrates a slide bar interface according to a further embodiment of the present invention.

Now referring to FIG. 7, an exemplary configuration of a complete slide bar interface 26 which provides means for setting configuration parameters for GPS receiver 10 in response to user input which specifies a desired quality of position estimate to be provided by receiver 10 is shown. The user input may be received using a slide bar control, which may be a graphical representation displayed to the user or, as shown, may be a physical slide bar control 60 as described above. The slide bar control 60 includes a slider 62 that may allow the user to choose from a number of predetermined settings 64, each corresponding to a set of GPS receiver configuration parameters. Distribution of the settings 64 over the range of the slide bar control 60 need not be linear. Preferably, each set of the configuration parameters includes a setting for a PDOP mask, an SNR mask, an elevation mask and a minimum number of satellites to be used by receiver 10 in making a position compensation. Of course, other slide bar controller implementations may be used and such controllers may allow for choosing only a limited (or, indeed, an expanded set of receiver configuration parameters), which may or may not include some or all of the above-mentioned configuration parameters.

Slide bar control 60 provides a selection signal 70 to selection means 72. The selection signal 70 corresponds to the setting of slide bar control 60 which the user has indicated. This will correspond to the desired receiver configuration. The select signal 70 is used to access the stored configuration parameter settings in selection means 72. For example, select signal 70 may be used to access a table as described above with reference to FIG. 5 to allow for a selection of a set of receiver configuration parameters that correspond to the setting of slide bar control 60. In response, selection means 72 provides a set of parameters settings 74 to the stages 30, 32, 34 and 36 which define the various masks to be employed.

The number of stages which define a configuration parameter for the receiver 10 may vary, depending upon the number of configuration parameters which may operate under the control of slide bar control 60. In any event, satellite data 24 may first be applied to an elevation mask 30. The purpose of elevation mask 30 is to weight or to exclude data from those satellites which are positioned below a designated elevation threshold as seen by antenna 14. In this way, only signals from satellites which are positioned at elevations sufficiently above the horizon so as to contribute to a position fix of the desired quality are utilized by receiver 10. Elevation mask 30 is set according to the parameter settings 74 provided by selection means 72.

The signals are then applied to a signal to noise ratio (SNR) mask 32. SNR mask 32 masks or weighs those signals according to the signal to noise ratio. For example, mask 32 allows only those signals which have a sufficient signal to noise ratio, as determined by the setting of the SNR mask according to the parameter settings 74, so as to contribute to a position fix of the desired quality to pass. The signals are also applied to a PDOP mask 34 which weights or filters out signals from satellites according to a predetermined PDOP criterion. For example, the mask 34 filters out signals which do not meet a desired PDOP criterion. PDOP mask may also be set at a desired level according to parameter settings 74. Signals are passed to stage 36 which weights or filters out according to the number of visible satellites. For example, the stage 36 filters out those data signals that are not originating from at least a designated minimum number of satellites. The number of satellites for the desired quality of position fix is set according to the parameter settings 74 provided by selection means 72 based on the position of slider 62.

Once processed and assuming the minimum data requirements set by the mask are met, the signals are applied to the position determination algorithm 28 to compute an estimate of the position of receiver 10.

As shown, each of the stages 30, 32, 34 and 36 of slide bar interface 26 will weight or exclude signals which may otherwise have been used for the position computation. If at any time insufficient data remains to achieve a position solution which would meet or exceed the desired quality (as specified by user input 27), that information is reported to a stage 38. Stage 38 is a "no solution resolution stage" which recognizes that insufficient information or satellite data signals is/are present in the received satellite data 24 to satisfy the desired quality of position fix. Stage 38 may report this information to the user (e.g., by reporting an error message to processing stage 18 which may then cause a message to be displayed to the user on display 20) as a prompt for the user to select a different set of configuration parameter using slide bar control 60. Again, any or all of the filtering operations may be done in a parallel, rather than a sequential order.

Thus, a user interface for GPS receiver has been described. As indicted throughout this detailed description, however, the exemplary embodiments discussed herein should be regarded as examples of the present invention, which is to be measured only in terms of the claims which follow.

What is claimed is:

1. A method comprising setting a plurality of configuration parameters for a global positioning system (GPS) receiver in response to a single input specifying a desired quality of position estimate to be provided by the receiver.

2. The method of claim 1 wherein the input is received using a slide bar control.

3. The method of claim 2 wherein the slide bar control is a graphical representation displayed.

4. The method of claim 3 wherein the slide bar control allows selection of a setting from a number of predetermined settings, each corresponding to a set of GPS receiver configuration parameters.

5. The method of claim 4 wherein the GPS receiver configuration parameters are chosen from a group comprising position dilution of precision (PDOP), signal-to-noise ratio, satellite elevation and a minimum number of satellites.

6. A method of claim 4 wherein each set comprises two or more GPS receiver configuration parameters.

7. The method of claim 4 wherein the distribution of the predetermined settings of the slide bar control is non-linear.

8. The method of claim 7 wherein each set of GPS receiver configuration parameters includes one or more settings for GPS receiver parameters chosen from a group comprising a position dilution of precision (PDOP) mask, a signal-to-noise ratio (SNR) mask, an elevation mask and a minimum number of satellites.

9. A method for controlling the performance of a global positioning system (GPS) receiver comprising:

receiving a single input indicating a slide bar setting between a minimum slide bar setting and a maximum slide bar setting representing relative quality of position estimates to be provided by the GPS receiver; and adjusting a plurality of GPS operating parameters of the receiver in response to the slide bar setting.

10. The method as set forth in claim 9, wherein the operating parameters are selected from the group consisting of a signal-to-noise-ratio (SNR), PDOP, elevation and minimum number of satellites.

11. The method as set forth in claim 9, wherein the slide bar settings are selected from a group consisting of quantity measures, quality of position measures, and speed of acquisition measures.

12. A control system comprising a control means for concurrently adjusting a plurality of global positioning system (GPS) configuration parameters for a GPS receiver in response to a single input specifying a desired quality of position estimate and a processing means for determining a position of the receiver.

13. The control system of claim 12, wherein the single input is generated by a slide bar.

14. The control system of claim 13, wherein the slide bar comprises a graphical representation of a slide bar.

15. The control system of claim 12, wherein the GPS configuration parameters are chosen from a group comprising position dilution of precision (PDOP), single-to-noise ratio, satellite elevation and a minimum number of satellites.

16. A mechanism for controlling the performance of a positioning system receiver comprising:

a slide bar configured to control the performance of the receiver by allowing specification of desired quality of position estimates to be provided by the positioning system; and a controller, configured to be responsive to the slide bar setting and to adjust a plurality of positioning system receiver operating parameters according to a single slide bar setting.

17. The mechanism as set forth in claim 16, wherein a plurality of receiver operating parameters are selected from the group comprising a position dilution of precision (PDOP), elevation, signal-to-noise ratio (SNR), and a minimum number of satellites in view.

18. The mechanism as set forth in claim 16, wherein the mechanism is located in a handheld positioning system receiver.

19. A global positioning system (GPS) receiver comprising an interface and a processing means for concurrently adjusting a plurality of GPS receiver configuration parameters in response to a single signal produced by the interface to specify a desired quality of position estimate.

20. The GPS receiver of claim 19, wherein the interface is selected from the group comprising a slide bar and a graphical representation of a slide bar.

21. The GPS receiver of claim 19, wherein the GPS configuration parameters include position dilution of precision (PDOP), signal-to-noise ratio, satellite elevation and a minimum number of satellites.

22. The GPS receiver of claim 19, wherein the interface comprises a number of predetermined setting used to generate a signal, each signal corresponding to a set of the GPS configuration parameters for the receiver.

23. The GPS receiver of claim 22, wherein the sets of GPS configuration parameters corresponding to the predetermined settings of the interface are distributed in a non-linear fashion over a range of settings provided by the interfaces.

24. A global positioning system (GPS) receiver comprising an antenna and a control system which enables adjustment of a plurality of GPS configuration parameters for the receiver via a single adjustment on a user interface to specify a desired quality of position estimate.

25. The GPS receiver of claim 24, wherein the user interface is selected from the group comprising a slide bar and a graphical representation of a slide bar.

26. The GPS receiver of claim 25, wherein the GPS configuration parameters are chosen from a group comprising position dilution of precision (PDOP), signal-to-noise ratio, satellite elevation and a minimum number of satellites.

27. The GPS receiver of claim 25, wherein the interface comprise a number of predetermined settings, each corresponding to a set of the GPS configuration parameters for the receiver.

28. In a global positioning system (GPS) receiver, a method comprising:

receiving a single input specifying a relative quality of position estimates to be provided by the GPS receiver; and simultaneously setting a plurality of GPS configuration parameters in response to the single input.

29. The GPS receiver of claim 28, wherein GPS configuration parameters are associated with one or more selectable relative quality of position estimate values determined empirically and non-linearly.

* * * * *